US 7,460,037 B2

(12) United States Patent
Cattone et al.

(10) Patent No.: US 7,460,037 B2
(45) Date of Patent: Dec. 2, 2008

(54) METHOD AND APPARATUS FOR REPLACING A PORTION OF A FIRST DIGITAL SIGNAL WITH A SECOND DIGITAL SIGNAL

(75) Inventors: Jeremy L. Cattone, Tigard, OR (US); Larry A. Westerman, Portland, OR (US)

(73) Assignee: Ensequence, Inc., Portland, OR (US)

( * ) Notice: Subject to any disclaimer, the term of this patent is extended or adjusted under 35 U.S.C. 154(b) by 0 days.

(21) Appl. No.: 11/755,595

(22) Filed: May 30, 2007

(65) Prior Publication Data

US 2007/0222652 A1   Sep. 27, 2007

Related U.S. Application Data

(63) Continuation-in-part of application No. 11/200,914, filed on Aug. 10, 2005.

(60) Provisional application No. 60/682,030, filed on May 16, 2005.

(51) Int. Cl.
*H03M 7/30* (2006.01)

(52) U.S. Cl. .......................... 341/76; 341/70; 342/188; 303/140

(58) Field of Classification Search ............. 341/70–90; 342/188; 303/140
See application file for complete search history.

(56) References Cited

U.S. PATENT DOCUMENTS

| | | | | |
|---|---|---|---|---|
| 5,510,798 A * | 4/1996 | Bauer | ..................... | 342/357.03 |
| 5,600,329 A * | 2/1997 | Brenner | ................. | 342/357.03 |
| 5,731,788 A * | 3/1998 | Reeds | .................... | 342/357.07 |
| 5,868,474 A * | 2/1999 | Abe et al. | ..................... | 303/140 |
| 6,262,681 B1 * | 7/2001 | Persechini | .................. | 342/188 |
| 6,675,387 B1 | 1/2004 | Boucher et al. | | |
| 7,145,920 B2 * | 12/2006 | Kinoshita et al. | ........... | 370/503 |

* cited by examiner

*Primary Examiner*—Lam T Mai
(74) *Attorney, Agent, or Firm*—Black Lowe & Graham, PLLC

(57) ABSTRACT

Method, system and computer program product for replacing a portion of a digital signal by applying a first difference correction that, after range limiting, converts the samples in the replacement portion to extremum values; then applying a second difference correction based on the difference between the extremum values and the desired replacement values. The first and second sets of correction values are thus independent of the original values in the first digital signal.

42 Claims, 8 Drawing Sheets

METHOD AND APPARATUS FOR REPLACING A PORTION OF A FIRST DIGITAL SIGNAL WITH A SECOND DIGITAL SIGNAL

CROSS-REFERENCE TO RELATED APPLICATIONS

This application is a Continuation-in-Part of U.S. patent application Ser. No. 11/200,914 entitled "FLEXIBLE USE OF MPEG ENCODED IMAGES," filed on Aug. 10, 2005, which claims priority to U.S. Provisional Application No. 60/682,030 entitled "METHODS AND SYSTEMS FOR ACHIEVING TRANSITION EFFECTS WITH MPEG-ENCODED PICTURE CONTENT", filed on May 16, 2005, and is incorporated herein by reference.

FIELD OF THE INVENTION

This invention relates generally to the encoding of digital signals using a differential code, and more specifically to the encoding and application of a differential change to a digital signal.

BACKGROUND OF THE INVENTION

Pulse code modulation (PCM) is the well-known process of sampling an analog signal at regular intervals, thereby representing and approximating the analog signal as a sequence of digital values. Differential pulse code modulation (DPCM) represents each successive value in a temporal or spatial sequence of values using the difference between the previous value and the sampled or desired value of the current point.

However, differential encoding can also be applied in multi-dimensional applications. For example, a previously-sampled signal (of one or more dimensions) can be characterized as a predictor of the current value of the signal, and the differences between the previous or predictor value, and the current value, can be expressed as differences. An example of such an approach is found in the Motion Picture Experts Group (MPEG) video encoding standards (MPEG-1, ISO/IEC 11172-2, and MPEG-2, ISO/IEC 13818-2, incorporated herein by reference.) In these standards, one method of compressing a motion video sequence is to utilize the content of one decoded field or frame of video as the predictor for a subsequent field or frame. The differences between the predictor and actual values can be expressed as an encoded set of difference values, the differences being applied to the predictor content to produce the updated content.

Computing the values of differential correctors to a predictor signal is a straight-forward process. For example, in differential coding of the difference between two images, if $P[i][j]$ is the value of a previous decoded image pixel in the i-th row and j-th column, and $S[i][j]$ is the sampled value for the current image, the difference value $D[i][j]$ is computed as $D[i][j]=S[i][j]-P[i][j]$. The resulting difference value $D[i][j]$ is then added to the predictor $P[i][j]$ to produce the new sample value $S[i][j]$. In many differential encoding systems, the difference values can be expressed in a compact manner, thereby reducing the amount of data required to produce the updated signal. For instance, in an image coding system, the coefficients i and j may not run over the entire image, but only over the portion which is modified; for other pixel positions, the difference is zero. As an example, consider the case where a new sub-image is to be superimposed on a portion of a previous image. If the new sub-image is t rows tall and w columns wide, and the upper-left corner of the superimposed image is placed at row r and column c, only pixel positions in rows r through (r+w−1) and columns c through (c+w−1) can have non-zero difference values. In this case, an efficient coding scheme may be able to encode the differential corrector values more compactly owing to the multiplicity of zero values. The MPEG-1 and MPEG-2 video encoding standards incorporate such coding efficiency.

Note that in this example of updating a portion of an image, the difference values depend on the values of both the previously decoded (reference) image and the values of the new (replacement) sub-image. When computing the difference values, the specific $S[i][j]$ pixel values used in the calculation will be based on the position (r,c) where the sub-image is superimposed on the reference image. This means that in general the encoded difference corrector will be unique to each possible placement position of the sub-image within the reference image.

Commonly in PCM systems, each digital sample has a finite resolution and limited range. For example, in the common sRGB image color coding standard (IEC 61966-2), each of the red, green and blue samples is limited to the range 0-255. By convention, when a differential corrector is added to a digital sample with finite range, if the resulting value falls outside the range, the value is clipped or limited to the valid range. This requirement is explicitly stated in the MPEG standards (e.g., ISO/IEC 11172-2 section 2.4.4.2.)

SUMMARY OF THE INVENTION

The present invention provides methods, systems and products for replacing, in a digital system utilizing differential coding, a portion of a first digital signal with a second digital signal, whereby the encoded difference signal is independent of the content of the first digital signal that is replaced with the second digital signal.

In accordance with further aspects of the invention, the digital signal includes sampled audio.

In accordance with other aspects of the invention, the digital signal includes still images.

In accordance with other aspects of the invention, the digital signal includes volume images.

In accordance with still further aspects of the invention, the digital signal includes fields or frames of motion video.

In accordance with still further aspects of the invention, the digital signal includes fields or frames of motion video encoded using the MPEG-1 or MPEG-2 video compression standards.

In accordance with still further aspects of the invention, the encoded difference signals are encoded as MPEG P-frames or B-frames.

In accordance with still further aspects of the invention, the encoded difference signals are encoded as MPEG fields or frames using non-intra macroblock encoding.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
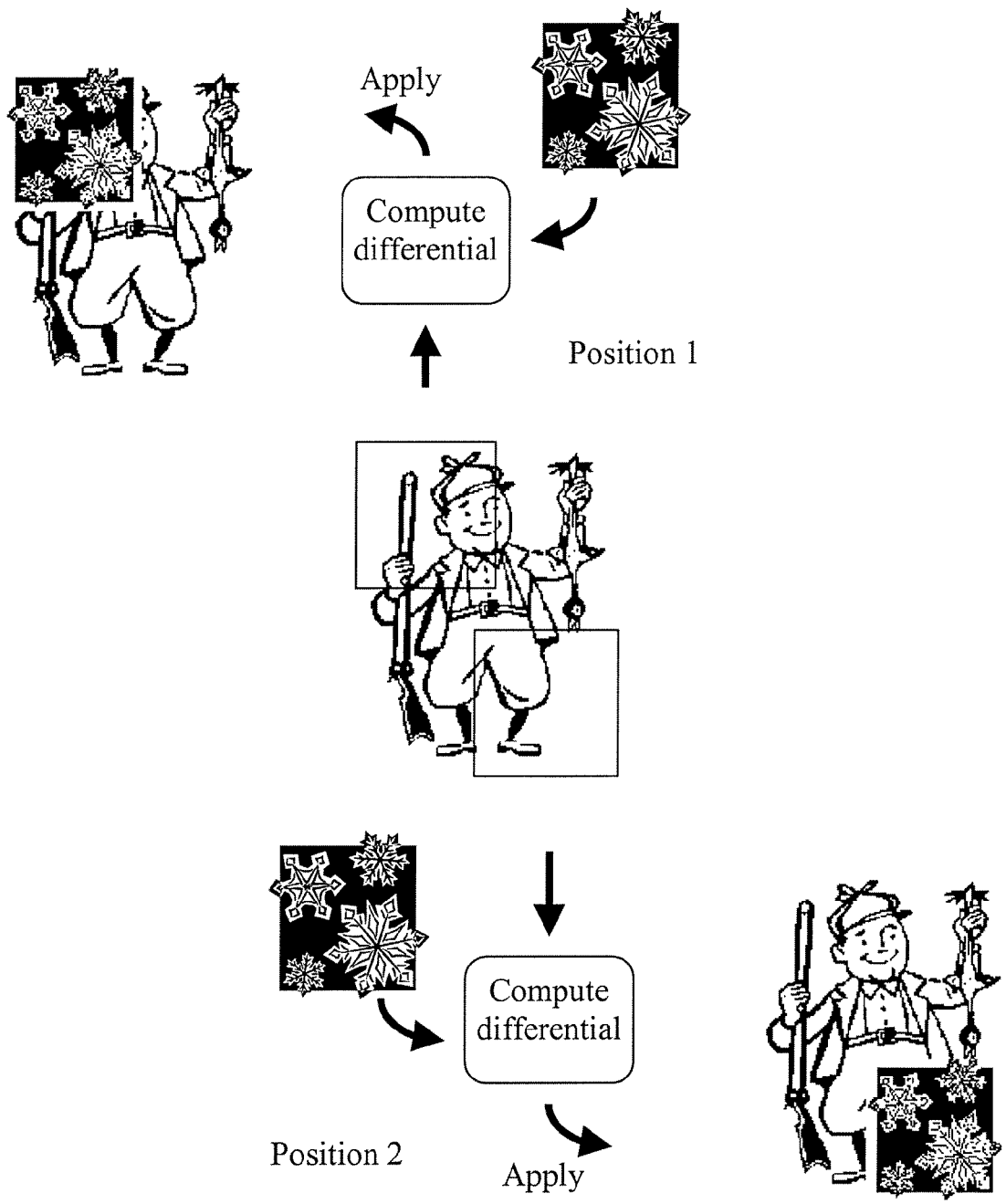
FIG. 1 is an illustration of differential image encoding from the prior art.

By way of overview, embodiments of the present invention provide a method, a system, and a computer program product for replacing a portion of a first digital signal with a second digital signal.

For the purpose of this description and the appended claims, a digital signal is a sequence of digital samples. A digital sample is a value or a set of values, each of which represents a (possibly-signed) magnitude of some quantity at a given point in time and/or space. A digital signal may be expressed as a one-dimensional vector of digital samples, or as a two- or higher-dimensional matrix of digital samples. One dimension may represent time; one, two, or three dimensions may represent physical coordinates. Thus, for example a digital audio signal is a one-dimensional vector sampled in the time dimension. A digital still image is a two-dimensional matrix sampled in two spatial dimensions, where each sample could be a single value of luminance, a triplet of color values, or a quadruplet of three color values and a transparency value. Similarly, a digital volume image is a three-dimensional matrix sampled in three spatial dimensions, each sample point being a luminance, a color triplet, or a color/transparency quadruplet. A video field or frame is a two-dimensional matrix sampled in two spatial dimensions, where by convention each sample is a Y/Cb/Cr triplet; a video sequence is a set of such matrices sampled in the time dimension.

For the purpose of this description and the appended claims, a differential encoding system is a system that computes and encodes the difference between two digital signals, then utilizes the encoded difference signal to update a first digital signal to yield a second updated digital signal. When computing the difference between two digital signals, a difference value is computed for each sample point, and each difference value has the same components as the sample value.

In a differential encoding system, the encoding of the difference signal may be lossless or lossy. In a lossless differential encoding system, the result of applying the difference signal to the predictive signal faithfully reproduces the desired updated signal. In a lossy differential encoding system, the process of encoding and decoding the difference signal may modify or distort the difference signal so that the result of applying the difference signal to the predictive signal may result in a distorted updated signal. In particular, one form that such distortion can take is saturation, meaning that for one or more sample points, the combination of a difference sample and a predictive sample may result in a sample value that falls outside the valid range for the value. A differential encoding system with this characteristic will have an explicit rule for dealing with this eventuality, allowing certainty as to the result in such a case. One typical rule is to clip each value of an updated sample to the valid range of the value, replacing any sample value less than the minimum of the valid range with the minimum of the range, and replacing any sample value greater than the maximum of the valid range with the maximum of the range.

Figure 2:
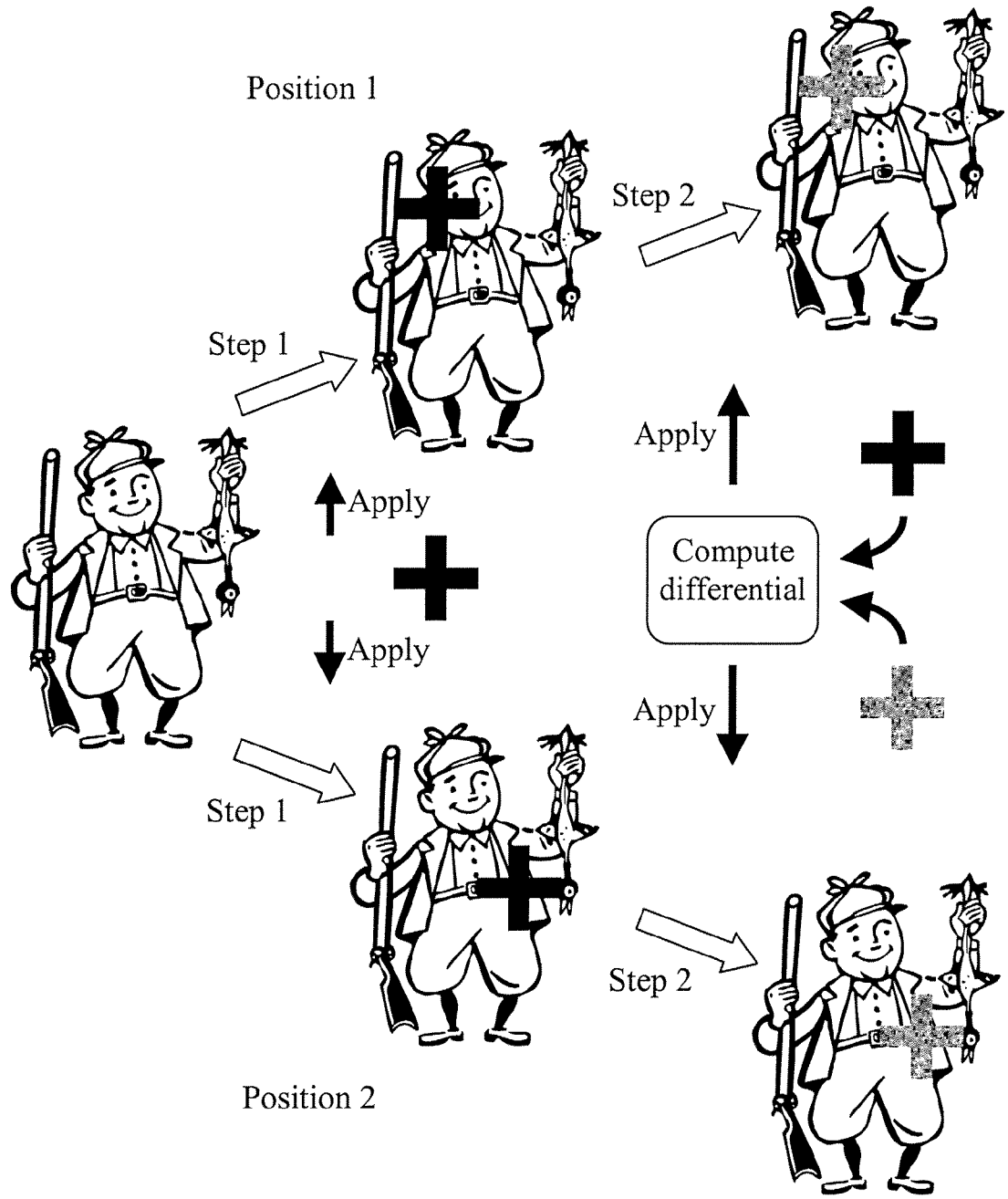
FIG. 2 is an illustration of the inventive method of differential encoding.

By way of illustrating the differences between the prior art and the inventive method, FIG. 1 and FIG. 2 are now described in more detail. FIG. 1 is a schematic representation of the prior art for encoding a difference signal, in this case when the task is to superimpose a second sub-image on a first image. The difference signal applied to the first image is based on the pixel samples in the area of overlap of the second sub-image and the first image. Superimposing the sub-image at two different positions on the first image requires two sets of calculations, and the difference signal is necessarily different between the two positions, as the underlying first image varies between the two positions.

FIG. 2 is a schematic representation of the current invention for encoding a difference signal for the task shown in FIG. 1. Superimposing a second sub-image over a first image requires two steps. In the first step, a difference signal (the saturation signal) is applied to the area of overlap of the second sub-image and the first image. The result of applying this first difference signal is to force each value of each sample within the area of overlap to or beyond a limit of the valid range for the value. The appropriate out-of-range rule for the encoding system results in each such value being set to a defined extremum value. To further amplify, consider the case of a luminance image, where each sample comprises a luminance value between 0 and 255 inclusive. If a difference value of −255 is applied to each pixel in the overlap area, the resulting after clipping to the valid range will be that each sample in the overlap area has a value of 0, regardless of the sample value in the first image.

The second step shown in FIG. 2 is to compute a difference signal for each sample point in the overlap area (the update signal), based on the difference between the result value of the first difference signal (one or the other extremum of the valid range for each value at each sample point), then to apply this difference signal to the intermediate result produced by the first step outlined above. Note that in this case, the values of the difference signal for the overlap area are independent of the underlying content of the first image.

There are at least two circumstances in which the inventive method of applying a difference signal is an improvement over the prior art. The first is illustrated in FIG. 2, and is the case where a differential encoding system allows a given portion of a difference signal to be applied to different portions of the predictive signal in an efficient manner. As will be explained below, the current invention, when combined with the prior art, provides a mechanism for accomplishing this for the MPEG-1 and MPEG-2 video encoding system.

Figure 4:
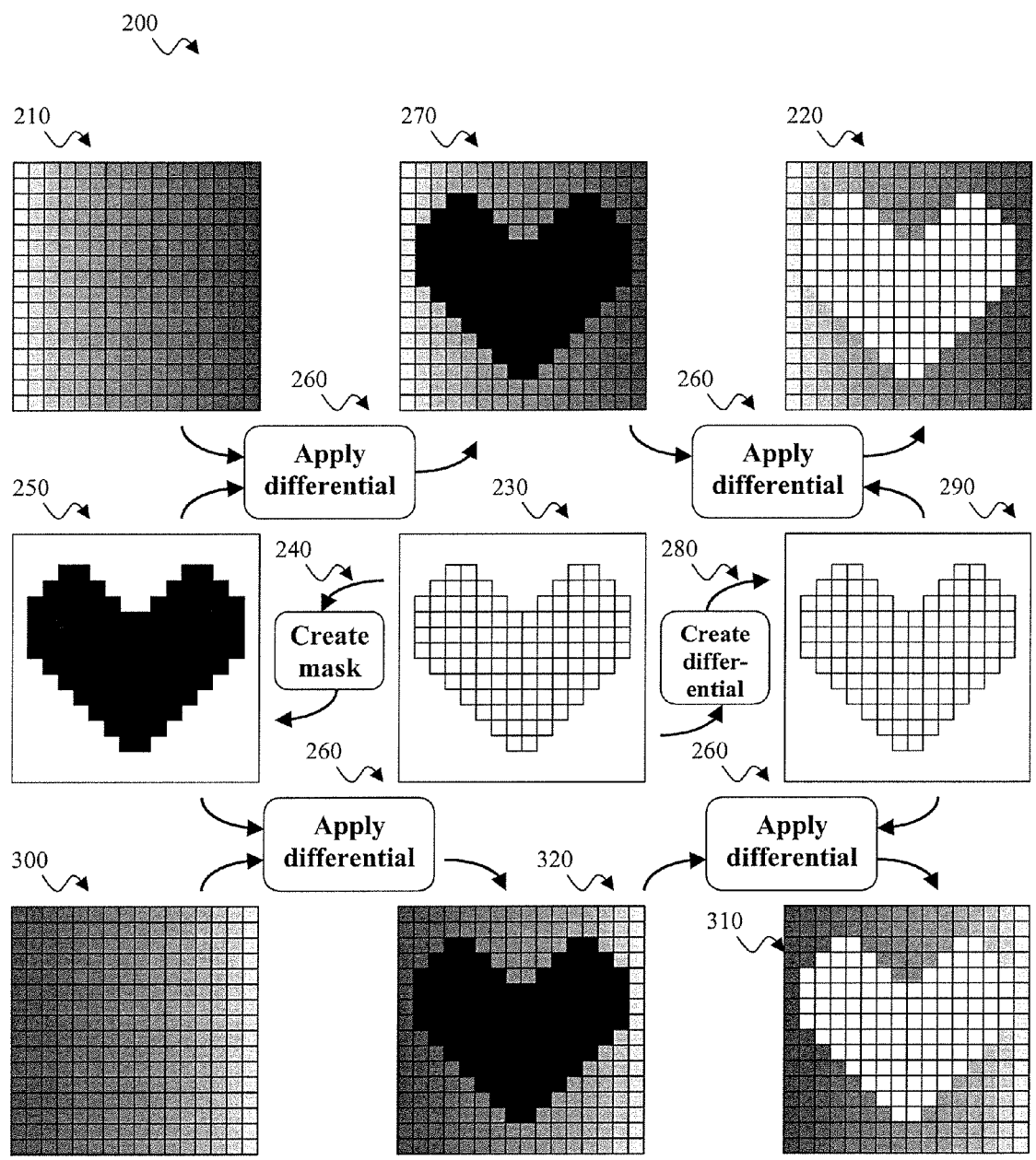
FIG. 4 is a detailed view of the inventive method for updating a portion of a digital image.

The second circumstance in which the inventive method of applying a difference signal is an improvement over the prior art is illustrated in FIG. 4. FIG. 4 shows schematically how the inventive method is applied when superimposing a sub-image over two different first images. In this case, the saturation signal and the update signal are independent of the content of the first image, so that the same signals can be used to update any given image.

Figure 3:
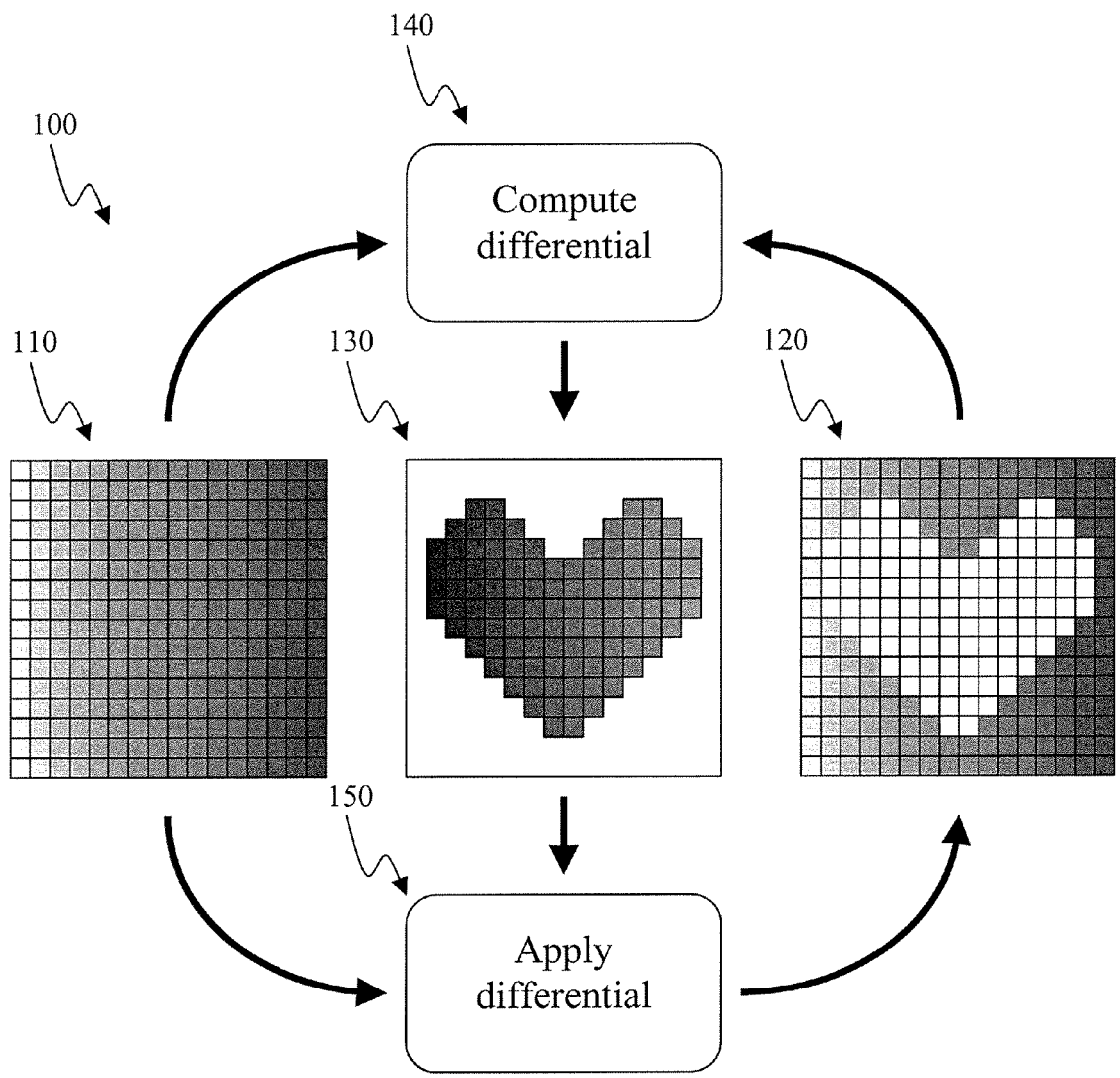
FIG. 3 is a detailed view of the prior art process for updating a portion of a digital image.

By way of further clarifying the difference between the prior art and the inventive method, FIG. 3 and FIG. 4 are now described. FIG. 3 shows an example from the prior art of a method 100 for computing and applying a difference signal to update a first image 110 to produce a second updated image 120. FIG. 3 shows individual pixels for each of the first image 110, the second image 120, and the difference signal 130. The method 100 includes a first process 140 of computing a difference signal 130 based on the pixel values of the first image 110 and the pixel values of the desired second image. A second process 150 then applies the difference signal to the first image 110 to produce the second image 120.

To further explain the first process 140, suppose the pixel columns and rows of an image are each numbered starting with 0; column and row numbers for the illustrated images run from 0 to 15 inclusive, increasing to the right and down, respectively. Further suppose that each pixel sample is a single luminance value within the range 0 to 255 inclusive. In FIG. 3, the pixels in any given column of the first image 110 have the same value. The pixels in the left-most column (column 0) have luminance 228, those in column 1 have luminance 218, those in column 2 have luminance 208, and so on to column 15, where each pixel has luminance 78. Thus, the pixel in image 1 at column 1, row 5 has luminance 218. Using the nomenclature described above, P[1][5]=218. The overlaid sub-image has a uniform luminance of 248 for each pixel. So the value of the difference signal at column 1, row 5 is D[1][5]=S[1][5]−P[1][5]=30. By this means, the value of each sample in the difference signal can be calculated, as shown conceptually in the difference signal, process 140. For each pixel position not outlined in the difference signal, process 140, the difference value is zero, so that the corresponding pixel position in the first image is not changed.

As noted above, the method 100 shown in FIG. 3 produces a difference signal 130 that is dependent on the content of the first image 110.

By way of contrast, FIG. 4 shows an exemplary implementation 200 of the inventive method for update a first image 210 to produce an updated second image 220. The portion of the first image 210 to be modified is shown in sub-image 230. At a step 240, a mask differential 250 is created from the non-empty pixels of the sub-image 230, where for every non-empty pixel position of the sub-image 230, the mask differential 250 has a difference value sufficient to cause the corresponding pixel position to be set to the minimum valid value for the luminance of a pixel. In this exemplary embodiment, the difference value at each non-empty pixel position of the mask is the maximum negative difference value. The mask differential 250 is then applied to the first image 210, at a step 260, yielding an intermediate image 270. Because of the range limitation for pixel values, the effect of applying the maximum negative difference value to any pixel in the first image 210 is to set the value for the pixel position in the intermediate image 270 to the minimum valid value for the pixel, regardless of the original value of the pixel. At a further step 280, an overlay differential 290 is created, based on the difference between each non-empty pixel position in the sub-image 230, and the minimum valid value for the luminance of a pixel. The resulting overlay differential 290 is applied to the intermediate image 270 at a step 260, yielding the second image 220.

A useful feature of the invention is further illustrated in FIG. 4, wherein an additional image 300, different from the first image 210, can be updated to produce an updated image 310. At a step 260, the mask differential 250 is applied to the image 300 to yield an intermediate image 320. At a further step 260, the overlay differential 290 is applied to the intermediate image 320 to yield the updated image 310. Updated image 220 bears the same overlaid pattern as updated image 310, having had differentials 250 and 290 applied in succession. In fact, the overlaid pattern can be applied to any starting image by use of the differentials 250 and 290, regardless of the content of the starting image.

In the exemplary implementation shown in FIG. 4, the images are two-dimensional grayscale images, so that each pixel sample is a single luminance value in the range of 0 to 255 inclusive. However, the implementation details are applicable to other digital signals such as one-dimensional audio signals, two-dimensional full-color images, and to three-dimensional full-color volume images. Further, in FIG. 4, the mask differential is created to force each pixel value to the minimum valid value for a pixel, and the overlay differential is created based on the minimum valid value. In an alternative embodiment, the mask differential is created to force each pixel value to the maximum valid value for a pixel, and the overlay differential is created based on the maximum valid value. In this alternative embodiment, the difference value at each non-empty pixel position of the mask is the maximum positive difference value.

Figure 5:
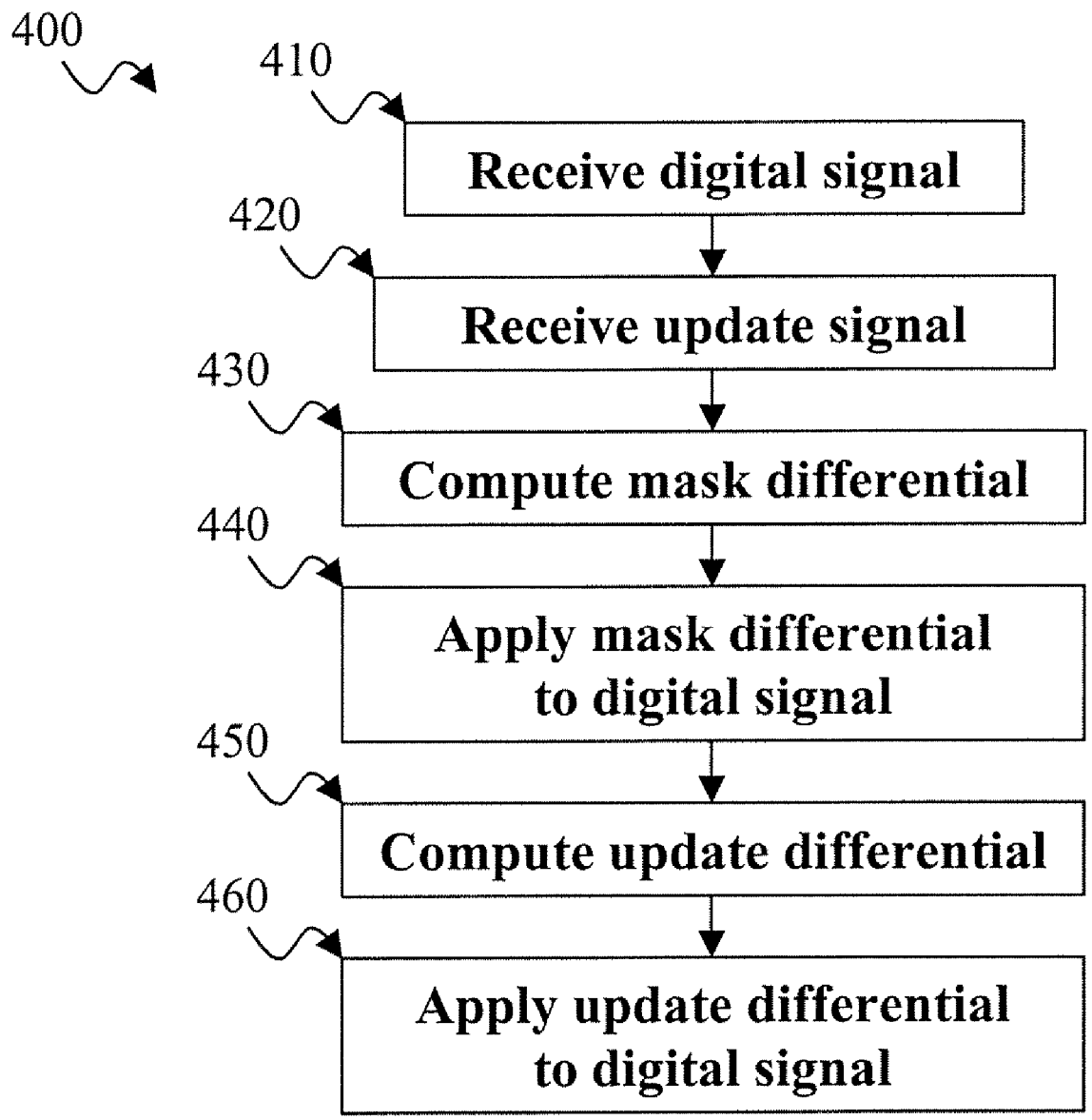
FIG. 5 is a flowchart of the inventive method of updating a portion of a digital signal.

FIG. 5 shows a flowchart 400 of an example process for updating a digital signal. At a step 410, a digital signal is received. At a further step 420 an update signal is received. At a further step 430, a mask differential is computed, wherein the values in the mask differential are sufficient to cause each corresponding sample in the digital signal to be set to an extremum value, for those sample positions of the digital signal to be replaced with the update signal. At a further step 440 the mask differential is applied to the digital signal. At a further step 450 an update differential is computed, wherein the values in the update differential are computed based on the difference between the extremum value set by a step 440 and the corresponding values of the update signal. At a further step 460, the update differential is further applied to the digital signal, yielding the updated digital signal.

Figure 6:
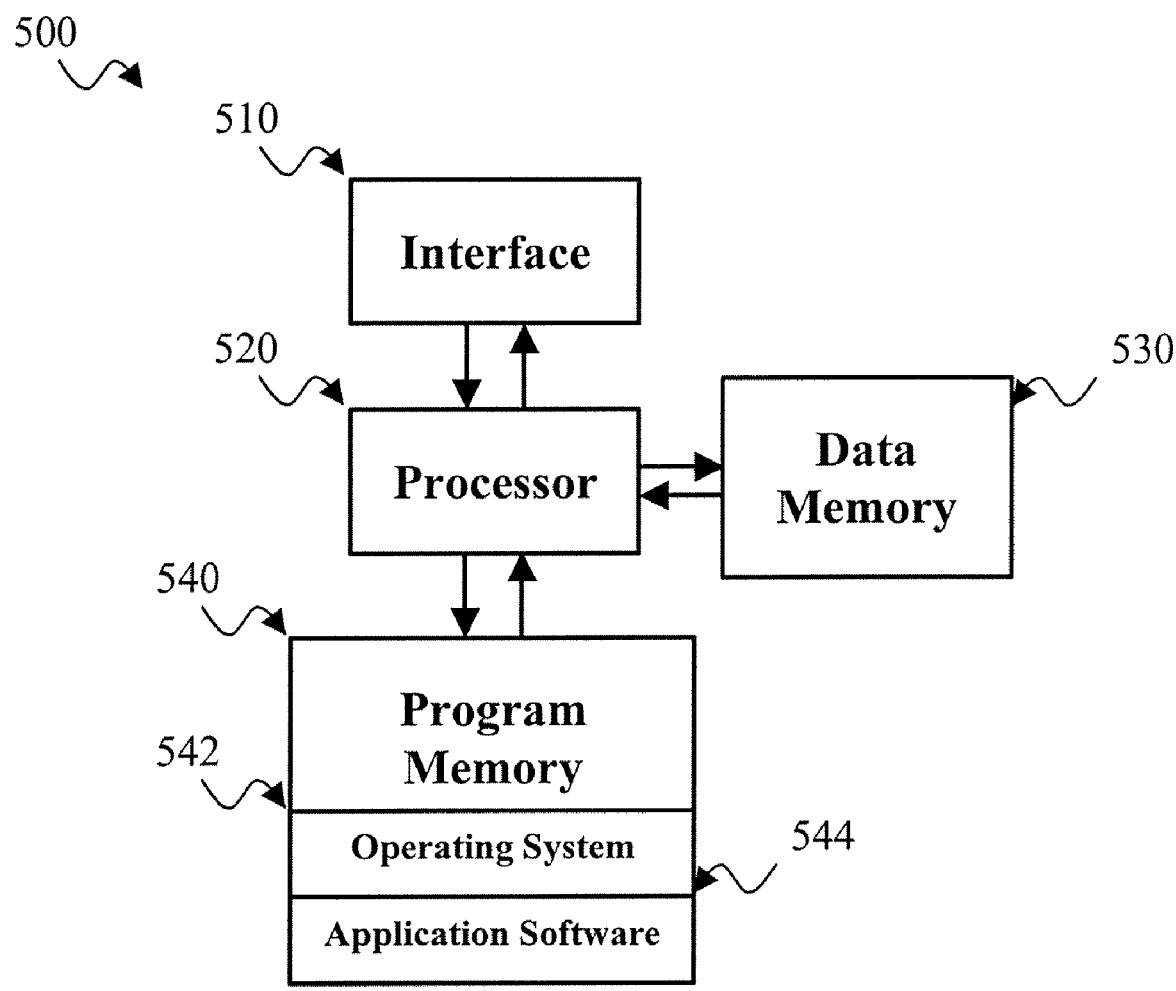
FIG. 6 is a diagram of a computer-based device for updating a portion of a digital signal.

FIG. 6 illustrates various components of an exemplary computer-based device 500 which may be implemented as any form of a computing or electronic device and which may be utilized to update a digital signal according to the teaching of the inventive method. A digital signal is received through an interface 510, which may be of any suitable type for receiving digital information, including by way of example a digital memory bus, an 802.11b wireless interface, an Internet Protocol interface, or other wired or wireless communication channel. The interface 510 may also be used to output an updated digital signal. A digital signal is read by processor 520, and stored in memory 530. Processor 520 may be a microprocessor, controller, or any other type of processor for processing executable instructions for receiving, storing and updating a digital signal according to the teaching of the inventive method. Program software memory 540 may contain platform software 542 comprising an operating system or any other suitable platform software may be provided at the computer-based device to enable application software 544 to be executed on the device.

The computer executable instructions may be provided using any computer-readable media, such as memory 540. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

Figure 7:
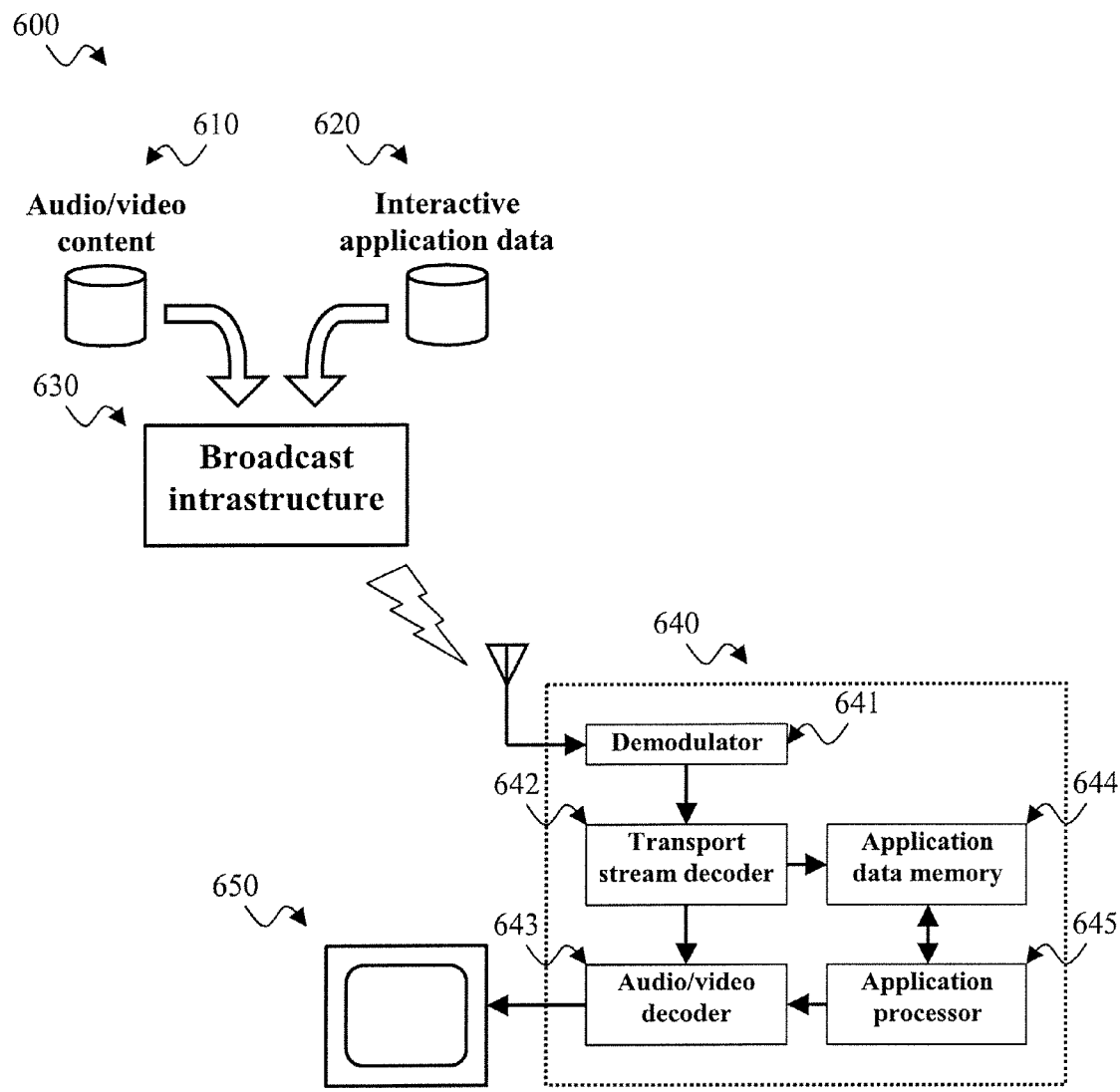
FIG. 7 is a diagram of a system for encoding and updating images in a broadcast environment.

As a further example of the application of the principles of the invention, FIG. 7 depicts a system 600 for transmitting interactive applications to digital set-top-box (STB) receivers. A useful capability in this context is the ability to present a full-color still background image then superimpose smaller full-color images as and where desired on the background image. Audio/video content 610 and interactive application data 620 are aggregated through a broadcast infrastructure 630 for transmittal to a digital receiver 640. FIG. 7 depicts a terrestrial broadcast system, but the inventive system is equally applicable in a satellite, wired cable, Internet-protocol television (IPTV), or terrestrial wireless distribution network. The digital receiver 640 contains a demodulator 641 for receiving transmitted signals and extracting digital signals contained therein. A transport stream decoder 642 separates out audio/video content and interactive application data from the output of the demodulator 641 to send audio/video content to an audio/video decoder 643 and interactive application data to a memory 644. An application processor 645 manages the operation of the digital receiver 540. Output signals from the audio/video decoder 643 are sent to a display device 650 for viewing. In operation, a background digital image, typically an MPEG image, is sent as part of the interactive application data 620. This background image is stored in the memory 644 then passed by the application processor 645 to the decoder 643 for display on the display device 650, such as a television. In an exemplary embodiment of the current invention, an interactive application updates a portion of the background image with an overlay image. To accomplish this, a mask differential image and an update differential image are incorporated into interactive application data 620. The two differential images are extracted from the broadcast content by the demodulator 641 and the transport stream decoder 642, and are stored in the memory 644. The application processor 645 first presents the mask differential image to the decoder 643, which results in a portion of the image displayed on display device 650 being set to an extremum value (black in the preferred embodiment). The application processor 645 then presents the update differential image to decoder 643, which results in a portion of the image displayed on the display device 650 being updated with the overlay image.

Figure 8:
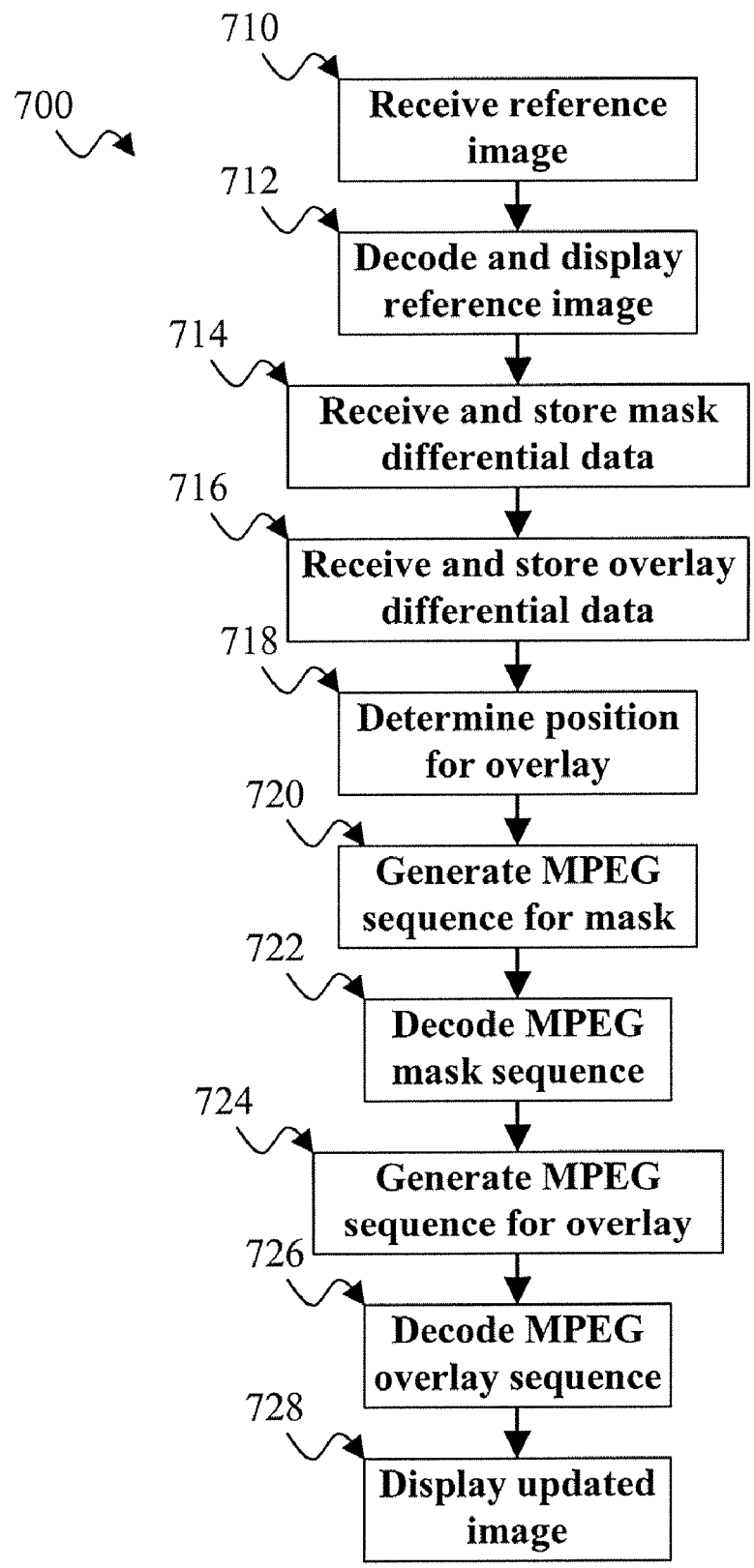
FIG. 8 is a flowchart of an alternative method of updating a portion of a digital image in a broadcast environment.

Co-pending U.S. Patent Application 2006/0256865, "Flexible Use of MPEG encoded images" (referenced in the following as '865) is incorporated herein in its entirety. The inventive technique of '865 can be applied in an alternative embodiment of the current invention. FIG. 8 depicts a flow chart 700 for utilizing repositioning of MPEG encoded images to achieve flexible overlay effects. At a step 710, a reference background image is received. At a further step 712 the reference image is decoded and displayed. At a further step 714, mask differential data, encoded using MPEG video compression techniques according to the teachings of '865, is received and stored. At a further step 716, overlay differential data, encoded using MPEG video compression techniques according to the teachings of '865, is received and stored. The mask differential data and overlay differential data are encoded using non-intra macroblocks, so as to modify rather than replace the corresponding data in the reference image, and may be encoded as P-frame or B-frame data. Macroblocks which are not altered by the mask differential data and overlay differential data may be encoded using forward prediction with no motion vector and no correction, or may be skipped, according to the requirements of the MPEG-1 and MPEG-2 encoding standards.

At a further step 718, a desired position for the overlay is determined. According to the teachings of '865, the overlay image can be anchored at any grid corner of a 16×16 pixel grid. At a further step 720, a first MPEG sequence is generated for the mask differential according to the teachings of '865. At a further step 722, the resulting first MPEG sequence is decoded. At a further step 724, a second MPEG sequence is generated for the overlay differential according to the teachings of '865. At a further step 726, the resulting second MPEG sequence is decoded. At a further step 728, the updated image is displayed with the overlay positioned as desired.

The term 'computer' is used herein to refer to any device with processing capability such that it can execute instructions. Such processing capabilities are incorporated into many different devices and therefore the term 'computer' includes PCs, servers, mobile telephone, personal digital assistance and many other devices.

The methods described herein may be performed by software in machine readable form on a storage medium. The software can be suitable for execution on a parallel processor or a serial processor such that the method steps may be carried out in any suitable order, or simultaneously.

The description acknowledges that software can be a valuable, separately tradable commodity. The description is intended to encompass software, which runs on or controls 'dumb' or standard hardware, to carry out the desired functions. It is also intended to encompass software which 'describes' or defines the configuration of hardware, such as HDL (hardware description language) software, as is used for designing silicon chips, or for configuring universal programmable chips, to carry out desired functions.

Storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer or computer network. By utilizing conventional techniques or later-developed means, all or a portion of the software instructions may be carried out by a dedicated circuit, such as a DSP, programmable logic array, or the like.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

While the preferred embodiment of the invention has been illustrated and described, as noted above, many changes can be made without departing from the spirit and scope of the invention. Accordingly, the scope of the invention is not limited by the the preferred embodiment. Instead, the invention should be determined entirely to the claims that follow.

What is claimed is:

1. In a digital system utilizing differential encoding, a method for replacing at least one sample value in a first digital signal with a new sample value, the method comprising:
    applying a first difference correction to at least one sample value, the first difference correction being of sufficient magnitude so that when applied at a location of the at least one sample, a resulting intermediate sample value, when limited to a valid range for the at least one sample value in the first digital signal, is an extremum value, regardless of magnitude of the at least one sample value;
    limiting the resulting intermediate sample value to the valid range for the at least one sample value in the first digital signal;
    computing a second difference correction, the second difference correction being computed from a difference between the new sample value and the extremum value; and
    applying the second difference correction to the limited intermediate sample value.

2. The method of claim 1, wherein the first difference correction is a maximum positive difference value.

3. The method of claim 1, wherein the first difference correction is a maximum negative difference value.

4. The method of claim 1, wherein the first digital signal is a digital audio signal.

5. The method of claim 1, wherein the first digital signal is a digital still image.

6. The method of claim 1, wherein the first digital signal is a digital volume image.

7. The method of claim 1, wherein the first digital signal is a digital video field or frame.

8. The method of claim 7, wherein the digital video field or frame is encoded using at least one of the MPEG-1 or MPEG-2 motion video encoding standard.

9. The method of claim 8, wherein the first difference correction is encoded as a P-frame.

10. The method of claim 8, wherein the first difference correction is encoded as a B-frame.

11. The method of claim 8, wherein the first difference correction is encoded using at least one non-intra-coded macroblock.

12. The method of claim 8, wherein the second difference correction is encoded as a P-frame.

13. The method of claim 8, wherein the second difference correction is encoded as a B-frame.

14. The method of claim 8, wherein the second difference correction is encoded using at least one non-intra-coded macroblock.

15. A system utilizing differential encoding for replacing at least one sample value in a digital signal with a new sample value, comprising:
   an interface component for receiving the digital signal;
   a memory component for storing the digital signal; and
   a processor including:
      a first component configured to compute a first difference correction, the first difference correction being of sufficient magnitude so that when applied to at least one sample value in the stored digital signal, a resulting intermediate value, when limited to a valid range for the at least one sample value in the stored digital signal, is an extremum value, regardless of magnitude of the at least one sample value;
      a second component configured to compute a second difference correction, the second difference correction being computed from a difference between the new sample value and the extremum value; and
      a third component configured to apply the first difference correction to the stored digital signal, to limit the resulting intermediate sample value to the valid range for the at least one sample value in the stored digital signal, and to apply the second difference correction to the stored digital signal.

16. The system of claim 15, wherein the first difference correction is a maximum positive difference value.

17. The system of claim 15, wherein the first difference correction is a maximum negative difference value.

18. The system of claim 15, wherein the first digital signal is a digital audio signal.

19. The system of claim 15, wherein the first digital signal is a digital still image.

20. The system of claim 15, wherein the first digital signal is a digital volume image.

21. The system of claim 15, wherein the first digital signal is a digital video field or frame.

22. The system of claim 21, wherein the digital video field or frame is encoded using at least one of the MPEG-1 or MPEG-2 motion video encoding standard.

23. The system of claim 22, wherein the first difference correction is encoded as a P-frame.

24. The system of claim 22, wherein the first difference correction is encoded as a B-frame.

25. The system of claim 22, wherein the first difference correction is encoded using at least one non-intra-coded macroblock.

26. The system of claim 22, wherein the second difference correction is encoded as a P-frame.

27. The system of claim 22, wherein the second difference correction is encoded as a B-frame.

28. The system of claim 22, wherein the second difference correction is encoded using at least one non-intra-coded macroblock.

29. A computer-readable medium encoded with a computer-executable program product and execute by a processor for replacing at least one sample value in a digital signal with a new sample value, the computer-executable program product comprising:
   a first computer program code for receiving the digital signal;
   a second computer program code for storing the digital signal;
   a third computer program code for computing a first difference correction, the first difference correction being of sufficient magnitude so that when applied to at least one sample value in the stored digital signal, a resulting intermediate sample value, when limited to a valid range for the at least one sample value in the stored digital signal, is an extremum value, regardless of magnitude value of the at least one sample value;
   a fourth computer program code for computing a second difference correction, the second difference correction being computed from a difference between the new sample value and the extremum value; and
   a fifth computer program code for applying the first difference correction to the stored digital signal, limiting the resulting intermediate sample value to the valid range for the at least one sample value in the stored digital signal, and further applying the second difference correction to the stored digital signal.

30. The computer-readable medium of claim 29, wherein the first difference correction is a maximum positive difference value.

31. The computer-readable medium of claim 29, wherein the first difference correction is a maximum negative difference value.

32. The computer-readable medium of claim 29, wherein the first digital signal is a digital audio signal.

33. The computer-readable medium of claim 29, wherein the first digital signal is a digital still image.

34. The computer-readable medium of claim 29, wherein the first digital signal is a digital volume image.

35. The computer-readable medium of claim 29, wherein the first digital signal is a digital video field or frame.

36. The computer-readable medium of claim 35, wherein the digital video field or frame is encoded using at least one of the MPEG-1 or MPEG-2 motion video encoding standard.

37. The computer-readable medium of claim 36, wherein the first difference correction is encoded as a P-frame.

38. The computer-readable medium of claim 36, wherein the first difference correction is encoded as a B-frame.

39. The computer-readable medium of claim 36, wherein the first difference correction is encoded using at least one non-intra-coded macroblock.

40. The computer-readable medium of claim 36, wherein the second difference correction is encoded as a P-frame.

41. The computer-readable medium of claim 36, wherein the second difference correction is encoded as a B-frame.

42. The computer-readable medium of claim 36, wherein the second difference correction is encoded using at least one non-intra-coded macroblock.

* * * * *